United States Patent Office 3,498,928
Patented Mar. 3, 1970

3,498,928
METHOD OF PREPARING GRANULAR OXIDIZING CATALYST FOR PREVENTING AIR CONTAMINATION BY CARBON MONOXIDE
Tsurahide Cho, Tokyo, and Tsutomu Kato, Hamamatsu-shi, Japan, assignors to Kachita Co., Ltd., Hamamatsu-shi, Japan, a corporation of Japan
No Drawing. Filed Jan. 5, 1968, Ser. No. 695,880
Claims priority, application Japan, Feb. 14, 1967, 42/8,957
Int. Cl. B01j 11/22, 11/06; B01d 53/34
U.S. Cl. 252—454          5 Claims

ABSTRACT OF THE DISCLOSURE

A method of preparing oxidizing granular catalyst for preventing air contamination caused mainly by the exhaust gas of motorcars which comprises the steps of mingling fine powder of activated natural zeolite ore with mixed fine powders of pure manganese oxide and copper oxide, lightly press-moulding the mingled substances into granules, causing a solution of aluminic ester in an organic solvent to be absorbed in said granules and making the ester bring about natural hydroylsis to vapourise off by-produced volatile matters, resulting in forming network binding structure of aluminum oxide in the granules.

---

This invention relates to an improved method of preparing a granular oxidizing catalyst for preventing air contamination caused by carbon monoxide, and especially for preventing air contamination caused by carbon monoxide contained in the exhaust gas from automobile engines by converting the carbon monoxide into carbon dioxide.

In recent years the problem of preventing air contamination in large cities, especially caused by the carbon monoxide contained in the exhaust gas released from the engines of a tremendous number of automobile running there, is assuming urgent importance from the standpoint of environmental sanitation. Said exhaust gas contains relatively large amounts of carbon monoxide, that is, about 3.5% by volume on an average. Those who inhale air containing CO at a concentration of more than 20 p.p.m. will have an impaired blood circulating system, accompanied by toxicosis of headache, giddiness and nausea, and such conditions may cause the death of affected people.

While many attempts have been made to remove CO gas from the exhaust gas, no effective absorbent of the gas nor oxidizing catalyst suitable for conversion of CO into harmless $CO_2$ gas has been developed. At present, some devices have been manufactured for trial wherein the exhaust gas is passed through an after-burner which functions to burn out by ignition the CO remaining in the exhaust gas. However, such after-burner may not be used widely because of its complicated construction, high cost of fabrication and inconvenience in handling.

One of the inventors of the present invention developed an oxidizing catalyst to remove carbon monoxide from the exhaust gas by converting it into carbon dioxide, and the catalyst was described in detail in the specification of his U.S. patent application No. 472,044, filed on July 14, 1965 which issued on Apr. 1, 1969 as U.S. Patent 3,436,356. The oxidizing catalyst comprised a heavily press-moulded granular product at a pressure of about 6,000 kg./cm.$^2$ having a granular size of about 5 mm., which consists of a uniform mixture of a fine powder of natural zeolite ore activated by dilute hydrochloric acid, and almost equal quantities of mixed fine powder consisting of from 6 to 7 parts by weight of manganese oxide and from 4 to 3 parts by weight of copper oxide.

The above mentioned oxidizing catalyst was loaded into a CO removing box disposed behind the exhaust muffler of a testing automobile, and subjected to a test of CO removal. After a run corresponding 5,000 km., the content of CO in the exhaust gas discharged from the box was 0.15%, increasing to 0.35% after a 10,000 km. run, and to about 0.7% after a 20,000 km. run. The annual average running distance for all sorts of motor car is estimated to be about 20,000 km., and so the catalyst has a working life of about one year without replacement by a new one. The present aim of the authorities is to lower the CO content of the exhaust gas to below 1.2%, so that the aim may be easily attained by using the abovemention oxidizing catalyst.

However, the catalyst was still unsatisfactory with respect to its manufacturing process, though it had an excellent chemical quality as an oxidizing agent. The reason is that the granulation of the catalyst required very high pressure moulding. No usual binder could be used in granulating the catalyst, because it would under such high pressure plug up the permeable microholes of zeolite ore and thereby lower the activity of the catalyst. Therefore, the only way was to press-mold the mixed powder merely by mechanical means at as high a pressure as 6,000 kg./cm.$^2$, using a special pressing machine. However, such press was extremely expensive, and was of too complicated mechanism to operate efficiently. Moreover, it was technically somewhat difficult to prepare homogenous granules in an accurate size.

It was discovered that, when actually used in the exhausting apparatus of an automobile, the catalyst particles party crumbled due to their brittleness by the vigorous shaking and jolting of the automobile particularly after a long run, thus reducing the ability of the catalyst to oxidize CO into $CO_2$ and shortening its effective life.

The object of the present invention is to improve the method described in the specification of U.S. patent application No. 472,044, and obtain for the prevention of air contamination by carbon monoxide the granules of an oxidizing catalyst which are stronger than those described in the aforesaid patent specification, so that the catalyst can better withstand any vigorous external forces without crumbling and decrease in the catalytic activity.

The above object is attained in accordance with the present invention by lightly press-moulding the catalyst materials small granular particles, providing an aluminic ester solution in an organic solvent to be absorbed in said granular particles, and permitting the ester to undergo natural hydrolysis to vaporize off or burn out volatile matter contained in the particles by the heat of hydrolysis. In this way, the granular particles of the catalyst are rigidly hardened by a network of aluminium oxide retained therein.

It is very easy to granulate the mixed fine powders of activated natural zeolite ore, manganese oxide and copper oxide as described in U.S. Patent 3,436,356 at a light moulding pressure of about 500 kg./cm.$^2$ instead of an extremely strong pressure of about 6,000 kg./cm.$^2$ in as mentioned said specification.

Before being put to any practical use, however, these relatively soft granules should be hardened by an appropriate means because of their low mechanical strength. While mixed powders generally allow addition of some common binders for their mechanical reinforcement, the granular catalyst under consideration does not permit the use of such binders, because they would plug the permeable microholes of zeolite ore to decrease the catalytic activity.

As a result of intensive research work and experiments, we have discovered a novel chemical binding agent which will create a microbinding network in the catalyst granules by chemical decomposition. This network does not substantially plug the microholes of granular zeolite ore, but greatly improves the strength of the granules. The above-mentioned chemical binding substance consists of aluminic esters which are aluminium alkoxide $[Al(OR)_3]n$ wherein R represents an alkyl or aryl group and $n$ represents the numerals 3 to 5, or a mixture of said aluminic esters and silicic acid esters which are tetraalkoxysilane $Si(OR)_4$ wherein R represents an alkyl group, dissolved in an organic solvent. These esters can be easily decomposed into aluminum oxide or silicon dioxide and alcohols by hydrolysis with accompanying heat generation.

When suitable amounts of such ester solution in an organic solvent are absorbed in the abovementioned catalyst granules which have been lightly press-moulded, the ester is immediately hydrolyzed by the moisture naturally adsorbed to the zeolite ore component of the granules with accompanying heat generation, and the temperature of the granules rises to several hundred degrees centigrade by further absorbing atmospheric moisture. At this temperature the organic solvent and respective alcohols derived from the hydrolysis of the esters volatilise or burn themselves, leaving only a fine network of aluminum oxide or alumina-silica compounds in the granules.

The granular catalyst obtained by the above-mentioned process has extremely high mechanical strength. To show the mechanical strength of said granular catalyst, there will now be given a comparison. If lines are drawn on a sheet of paper with the lightly press-moulded granule, they will appear as dark as those scratched by a 6B pencil, whereas the lines indicated by the catalyst granule prepared by the process of the present invention will remain as faint as those drawn with a 4H pencil.

To carry out the present invention, it is required to absorb the organic solution of the aluminic ester or its mixture with a silicic acid ester in the lightly press-moulded granules so as to obtain $Al_2O_3$ or $Al_2O_3+SiO_2$ from the esters in the ratio ranging from 2 to 6 percent by weight on the basis of final granules.

The granules of the catalyst obtained by using only the aforesaid aluminic ester solution in the organic solvent has substantially the same catalytic activity as the strongly press-moulded granules prepared with no binder as described in the specification of U.S. patent application No. 472,044. However, use of a mixture of aluminic ester and silicic acid ester dissolved in an organic solvent increases the catalytic activity and heat resistivity of the resultant granules as compared with those containing no silicic acid ester. That is to say, whether strongly press-moulded with no binder or lightly press-moulded and treated with an organic solution of an aluminic ester alone, the granular catalyst thus processed would lose most of its activity for the oxidation of carbon monoxide, if once heated to 700° C. and over, even though it may be cooled thereafter. In contrast to this, the granular catalyst lightly press-moulded and treated with a solution of aluminic ester and silicic acid ester mixed in the ratio of 1 to 2 moles of $SiO_2$ per mole of $Al_2O_3$ in the esters will in no way be affected in its activity, even if it is heated to as high a temperature as 900° C.

The higher heat resistivity of the catalyst containing the two esters means that it is safer against the exhaust heat from the automobile engine.

It has been noticed that the activity of the catalyst containing the two esters will be reduced progressively as the ratio of the silicic acid ester increases to more than 2 moles per mole of the aluminic ester, and that if the silicic acid ester alone is used as a binding material the catalyst would display no activity, though the reason for this has not been made clear yet. It has been experimentally confirmed that the most effective mixing ratio of the two esters for the oxidizing catalyst is one mole of $SiO_2$ per mole of $Al_2O_3$.

According to the method of the present invention, it is possible, as mentioned above, to prepare granular oxidizing catalysts for preventing air contamination by carbon monoxide very easily and reliably without using such an ultra high pressing machine as is involved in the method of the specification of U.S. patent application No. 472,044, and the resultant catalyst has excellent characteristics and it does not crumble in use.

The oxidizing catalyst prepared by the process of the present invention can be applied not only in detoxicating the exhaust gas from the automobile engine, but also for other purposes just as effectively as that produced by the previous invention. For instance, the subject catalyst may be packed in an household air cleaner to remove the carbon monoxide released from an oil stove, or in a car room air cleaner to remove the gas leaking from car engines. Further, the catalyst will be particularly suitable for a CO gas preventing mask used in coal mine accidents or general conflagrations.

Small amounts of some light hydrocarbons, such as methane, ethane or propane, are present in the exhaust gas from automobile engines together with CO gas, and these gases are also harmful air contaminating substances. However, the catalyst of the present invention can easily oxidize these harmful gases including carbon monoxide into harmless carbon dioxide.

The invention is more clearly set forth in the following examples, given by way of illustration and not in limitation.

EXAMPLE 1

Raw mixed fine powders were prepared in the same manner as in the aforementioned patent. A fine powder of manganese oxide, one of the principal components of the catalyst, was first prepared by the following procedure: dissolve 500 g. of commercial manganese sulfate $MnSO_4 \cdot 4H_2O$ in 800 cc. of water while heating to 40° C., which temperature offers a maximum solubility of the salt in water, and allow the solution to cool so as to obtain a saturated solution with a small amount of precipitation of the salt. Add slowly 1,200 g. of 98 percent sulfuric acid to 1,000 g. of said saturated solution so as to keep the temperature of the solution at about 55° C. at which extremely fine precipitates of white anhydrous manganese sulfate can be settled down.

Add 210 g. of potassium permanganate powders to said saturated solution containing the fine precipitates of anhydrous manganese sulfate while stirring at the almost constant temperature of from 50 to 60° C. to cause the following reaction (1).

$$5MnSO_4+4KMnO_4+3H_2O$$
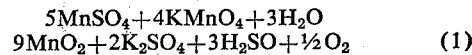
$$9MnO_2+2K_2SO_4+3H_2SO+\tfrac{1}{2}O_2 \qquad (1)$$

All will be seen from Equation 1, fine precipitates of manganese oxide are obtained from the reacting solution together with generated oxygen gas. The reacting solution was cooled by being stirred for a while after the addition of potassium permanganate and the precipitate was water-washed until the mother liquor became neutral. Afterwards, the precipitate was filtered out of the mother liquor and fully dried, and there were obtained extremely pure and fine powders of manganese oxide.

Fine powders of copper oxide as a promotor of the catalyst were prepared as follows: dissolve 400 g. of commercial copper sulfate $CuSO_4 \cdot 5H_2O$ in 2,000 cc. of water while heating to 50° C. Add slowly 1,400 cc. of 10 percent aqueous solution of sodium hydroxide to the copper sulfate solution so as to keep the temperature of the mixed solution at about 50° C. at which fine precipitates of blue-black cupric hydroxide can be deposited, pH of the mixed solution at that time being 8.

Then the solution containing the precipitate of cupric hydroxide was cooled and the precipitate was water-washed until the mother liquor became neutral. Afterwards, the precipitate was filtered out of the mother liquor. After drying and calcination, there were obtained extremely pure and fine powders of copper oxide, another component material for the catalyst.

Natural zeolite ore, the composition of which is $SiO_2$ 66.68%, $Al_2O_3$ 11.30%, $Fe_2O_3$ 0.89%, $TiO_2$ 0.16%, MnO trace, MgO 1.14%, CaO 1.86%, $K_2O$ 4.25%, $Na_2O$ 0.43% and $H_2O$ the remainder, was crushed to the size of about 4 Tyler mesh. The crushed ore was soaked in dilute hydrochloric acid of 6% concentration for 24 hours, and then water-washed after being separated from the liquor. Finally the ore thus treated was calcined at the temperature of 650° C. after being dried for activation. By pulverising the calcined ore to the size of about 100 Tyler mesh, there was obtained a third component material for the catalyst.

A mixture of 10 weight parts of the activated zeolite powders, 7 weight parts of the aforementioned manganese oxide powders and 3 weight parts of the copper oxide was press-moulded into granules of 5 mm. size at a pressure of 500 kg./cm.²

Aluminum isopropoxide solution in isopropyl alcohol was obtained by adding 26.5 g. of metallic aluminum to 500 cc. of isopropyl alcohol containing 0.1 g. of a mercuric chloride catalyst while heating.

Into the above-mentioned solution, 1,000 g. of the activated granular zeolite ore was carefully introduced little by little to absorb almost all of the solution in it. Simultaneously aluminum isopropoxide in the solution was hydrolysed by the water naturally absorbed by the zeolite ore contained in the granules, and the temperature of the mass rose to about 500° C. by the heat of hydrolysis and that of combustion which was caused by natural ignition of isopropyl alcohol. On this account, all remaining isopropyl alcohol disappeared from the mixture by evaporation and combustion, and hardness of the granules increased greatly. The granules contained about 5 weight percent of $Al_2O_3$ as network binding material. Thus was formed the oxidizing catalyst for preventing air contamination by carbon monoxide.

A CO removing box positioned after the exhaust muffler of a passenger gasoline car engine having 4 cylinders and capacity of 1,200 cc. was filled with 8 l. of the granular oxidizing catalyst. The box had a device for introducing air into the CO removing box necessary to oxidize CO in the exhaust gas. With this apparatus running tests of the engine were carried out in a laboratory. The results indicated that the CO content in the final exhaust gas was only 0.7 percent by volume after a run of 20,000 km. and further that the CO content showed no increase even after a run of 25,000 km.

EXAMPLE 2

To 147 g. of aluminum isobutoxide and 64 g. of ethyl silicate dissolved in 300 cc. of xylene, there was added 1,000 g. of the same lightly press-moulded granular substance as Example 1 to absorb almost all of the solution. Owing to the natural drying of the granules in the air gel having the composition of $Al_2O_3 \cdot SiO_2$ was produced among the microapertures of the granules due to hydrolysis by atomspheric moisture. At this time, almost all of the solvent was vapourised off by the heat of hydrolysis. In order to remove small amounts of the remaining solvent and byproduct alcohol which was caused by hydrolysis, the granules were heated in a furnace to naturally ignite, and all organic substances were taken off by self-combustion. Thus, there was obtained granular oxidizing catalyst similar to that of Example 1. The granules contained about 4.5 weight percent of $Al_2O_3 \cdot SiO_2$ as network binding material.

The activity and life of the catalyst was somewhat better than that of Example 1. Furthermore, the product was effectively resistant to a temperature of about 900° C., although that of Example 1 withstood only about 700° C.

EXAMPLE 3

Into a two-necked closed vessel was poured 300 cc. of benzene to dissolve 90 g. of aluminum isobutoxide and 77 g. of ethyl silicate. Further into this solution was introduced 1,000 g. of the same lightly press-moulded granular substance as in Example 1 to absorb almost all of the solution. Hydrolysis occurred at once with heat to produce a gaseous mixture of benzol, ethanol and isobutanol. The mixture was recovered from a condenser connected to one of the necks by introducing heated nitrogen gas into the vessel through the other neck, and there was obtained a granular oxidizing catalyst similar to that of Example 1. The granules contained about 4.0 weight percent of $Al_2O_3 \cdot 2SiO_2$ as network biding material.

The catalyst obtained had almost the same activity and life as in Example 1, and heat resistance up to about 850° C., being somewhat inferior to the value shown in Example 2.

While the invention has been described in connection with some preferred embodiments thereof, the invention is not limited thereto and includes any modifications and alternations which fall within the true spirit and scope of the invention as defined in the appended claims.

What is claimed is:

1. In a method for the preparation of an oxidizing granular catalyst for preventing air contamination caused by carbon monoxide which comprises mingling fine powders of activated natural zeolite with mixed powders of manganese oxide and copper oxide and pressure molding said mingled substances into granules; the improved method which comprises causing an organic solution of aluminum alkoxide represented by the formula $$[Al(OR)_3]_n$$

wherein R represents an alkyl group and $n$ represents the numerals 3 to 5, to be absorbed in said granules; and then subjecting the aluminum alkoxide to natural hydrolysis by the moisture in atmospheric air with the resultant volatilization of all volatile matters contained in the granules by the heat evolved as a result of said hydrolysis so as to form a network of alumina in said granules.

2. The method of claim 1 wherein the organic solution contains tetraalkoxysilane $Si(OR)_4$, wherein R represents an alkyl group, in addition to the aluminum alkoxide.

3. The method as defined in claim 1 further characterized in that the amount of said aluminum alkoxide in the granules is selected so as to limit the content of aluminum oxide derived from the aluminum alkoxide in the final granules to an amount within the range of from 2 to 6 percent by weight.

4. The method as defined in claim 2 further characterized in that the amounts of said aluminum alkoxide and tetraalkoxylsilane in the granules are selected so as to limit the total contents of aluminum oxide and silicon dioxide derived from said aluminum alkoxide and tetraalkoxysilane in the final granules within the range of from 2 to 6 percent by weight.

5. The method as defined in claim 2 further characterized in that the aluminum alkoxide and the tetraalkoxysilane are mixed so that the mol ratio of aluminum oxide from the aluminum alkoxide to the silicon dioxide from the tetraalkoxysilane in the final granules is between 1:1 and 1:2.

References Cited

UNITED STATES PATENTS

| | | | |
|---|---|---|---|
| 2,775,562 | 12/1956 | Dinwiddie et al. | 252—453 |
| 3,177,152 | 4/1965 | Kearby | 252—455 |
| 3,356,450 | 12/1967 | Heinze | 252—455 X |
| 3,381,454 | 5/1968 | Sponsel | 252—455 X |

DANIEL E. WYMAN, Primary Examiner

C. F. DEES, Assistant Examiner

U.S. Cl. X.R.

23—2; 252—455